US 6,987,803 B2

(12) United States Patent
Frenkel et al.

(10) Patent No.: US 6,987,803 B2
(45) Date of Patent: Jan. 17, 2006

(54) DATA COMMUNICATION SYSTEM WITH ADAPTIVE PRECODING

(75) Inventors: Liron Frenkel, Netanya (IL); Eliahu Shusterman, Kfar-Saba (IL)

(73) Assignee: Tioga Technologies, Inc., San Jose, CA (US)

( * ) Notice: Subject to any disclaimer, the term of this patent is extended or adjusted under 35 U.S.C. 154(b) by 736 days.

(21) Appl. No.: 09/915,748

(22) Filed: Jul. 26, 2001

(65) Prior Publication Data

US 2002/0044598 A1    Apr. 18, 2002

Related U.S. Application Data

(63) Continuation-in-part of application No. 09/472,109, filed on Dec. 27, 1999.

(51) Int. Cl.
*H03H 7/30* (2006.01)
(52) U.S. Cl. .................. 375/232; 375/229; 375/233
(58) Field of Classification Search .......... 375/232, 375/229, 233
See application file for complete search history.

(56) References Cited

U.S. PATENT DOCUMENTS 5,513,216 A * 4/1996 Gadot et al. ............ 375/233
5,604,769 A * 2/1997 Wang ...................... 375/229
6,167,082 A * 12/2000 Ling et al. ............... 375/233
6,289,047 B1 * 9/2001 Agazzi et al. ............ 375/232
6,792,049 B1 * 9/2004 Bao et al. ................. 375/285

FOREIGN PATENT DOCUMENTS

WO    WO 01/50645    7/2001

OTHER PUBLICATIONS

"Generalized square and hexagonal constellations for intersymbol-interference channels with generalized tomlinson-harashima precoders", by Wei, Published in IEEE Trans. On Comm. 42:9 (Sep. 1994), pp. 2713-2721.

* cited by examiner

*Primary Examiner*—Stephen Chin
*Assistant Examiner*—Cicely Ware
(74) *Attorney, Agent, or Firm*—Darby & Darby

(57) ABSTRACT

A receiver, for receiving a signal transmitted over a channel by a transmitter that includes a Tomlinson-Harashima precoder. The receiver includes a feed-forward equalizer (FFE), adapted to apply a feed-forward equalization function to the signal, so as to generate a sequence of equalized samples. A decision block is coupled to receive the equalized samples from the FFE and to generate a sequence of decision output samples responsive thereto, the decision block comprising an adaptive filter, having coefficients determined adaptively responsive to a characteristic of the channel. A Tomlinson-Harashima decoder is coupled to receive and decode the decision output samples so as to reconstruct the sequence of input symbols.

55 Claims, 5 Drawing Sheets

DATA COMMUNICATION SYSTEM WITH ADAPTIVE PRECODING

CROSS-REFERENCE TO RELATED APPLICATIONS

This application is a continuation-in-part of U.S. patent application Ser. No. 09/472,109, filed Dec. 27, 1999, which is assigned to the assignee of the present patent application and is incorporated herein by reference.

FIELD OF THE INVENTION

The present invention relates generally to high-speed data communications, and specifically to methods and devices for compensating for channel characteristics, such as inter-symbol interference and noise, during such communications.

BACKGROUND OF THE INVENTION

High-speed data transmission channels are often subject to severe inter-symbol interference (ISI), due to amplitude distortion in the frequency domain. The accepted solution to this problem is to use a feed-forward equalizer (FFE) together with a decision feedback equalizer (DFE) at the receiver, in order to cancel interference from past signals. One of the problems caused by such a DFE is error propagation, since once an error has been introduced into one of the samples, the DFE will "remember" the error over many subsequent samples.

If the channel impulse response is known, a suitable Tomlinson-Harashima precoder can be used in the transmitter, and can eliminate the need for the DFE in the receiver. Precoders of this sort are described by Wei, for example, in an article entitled, "Generalized Square and Hexagonal Constellations for Intersymbol-Interference Channels with Generalized Tomlinson-Harashima Precoders," published in *IEEE Transactions on Communications*, 42:9 (September 1994), pp. 2713–2721, which is incorporated herein by reference. The precoder in this context is intended to compensate for inter-symbol interference caused by a channel having an equivalent discrete-time response expressed as $$1 + \sum_{i=1}^{k} h_i z^{-i}.$$

The Tomlinson-Harashima precoder comprises a two-dimensional modulo device with a negative feedback loop. The modulo device takes each complex input symbol that it receives, r, into an output symbol s given by:

$$s_i = r_i - k_i \cdot 2M \tag{1}$$

wherein i=1,2, giving the real and imaginary parts of s and r; 2M is the modulo value; and $k_i$ is an integer such that $-M \leq s_i < M$. In the feedback loop, the symbols output by the modulo device are filtered by a digital filter having a discrete time response based on the equivalent discrete-time response of the channel, without the zero-order time-domain component. In other words, the filter response in the feedback loop is given by $$\sum_{i=1}^{k} h_i z^{-i}.$$

The filtered feedback symbols are subtracted from the modulated symbols (whether coded or uncoded) that are input to the precoder for transmission.

In the receiver, the channel-distorted symbols are input to a modulo device, which is identical to that in the precoder. Assuming that the equalizer's response is well-matched to the actual response of the channel, the symbols output by the modulo device in the receiver will be identical, to within the white Gaussian noise added by the channel, to the modulated symbols that were input to the precoder for transmission. The output symbols can then be processed by a decision device or Viterbi decoder, as appropriate, to recover the input data.

It commonly occurs in communication systems that the channel response and noise characteristics change over time or even in the course of a single communication session between a given receiver and transmitter. If the precoder has a fixed filter response in its feedback loop, it will not be able to compensate for such changes. Therefore, in some communication systems, an adaptive DFE is provided in the receiver, in addition to the precoder in the transmitter. Typically, a known training sequence is transmitted from the transmitter to the receiver, and an adaptation procedure, such as a least-mean-square (LMS) procedure, as is known in the art, is used to adjust the DFE filter coefficients to convergence. Once the DFE coefficients have converged, an indication of the coefficients is sent back to the transmitter for implementation in the feedback loop of the precoder. The DFE can then be deactivated entirely or, alternatively, it may remain active in order to adapt for any subsequent channel variations or noise.

U.S. Pat. Nos. 5,513,216 and 5,604,769, whose disclosures are incorporated herein by reference, describe a hybrid equalizer arrangement of this sort, using a DFE in the receiver in conjunction with a precoder in the transmitter. The DFE includes both an ISI DFE part and a noise-predictive DFE part. Signals received from the transmitter are first processed by a FFE and are then decoded by a Tomlinson-Harashima modulo decoder. The resultant decoded signals are processed by the DFE in conjunction with a slicer in order to recover the transmitted symbols. The ISI DFE coefficients are conveyed back for implementation in the precoder. The noise-predictive part of the DFE may remain active or, alternatively, the noise-predictive coefficients may be implemented in the precoder, as well. Assuming the adapted ISI DFE response to be I(z), and the noise-predictive DFE response to be N(z), the filter response in the feedback loop of the precoder is set to be $C(z)=[1+I(z)]\cdot[1+N(Z)]-1$. When variations occur in the channel characteristics, new coefficients may be determined at the DFE in a "quick retrain" procedure. These coefficients can then be conveyed back to the transmitter for implementation in the precoder.

SUMMARY OF THE INVENTION

It is an object of some aspects of the present invention to provide improved methods and devices for adaptive precoding of communication signals by a transmitter and for processing of such precoded signals at a receiver.

Aspects of the present invention are based on the realization that the precoding and equalization schemes described in U.S. Pat. Nos. 5,513,216 and 5,604,769 are flawed, in that they apply the DFE to the signals received from the transmitter only after modulo decoding. When the modulo operation is applied to the signals before the DFE stage, it can magnify small errors in the received signal, due to changes in channel characteristics such as the noise or ISI level, for example, into large errors in the decoded signal. These errors enter the DFE, which causes them to propagate over many subsequent symbols, leading to degradation of communication performance, particularly when a noisy channel is involved.

Thus, in preferred embodiments of the present invention, a transmitter precodes digital data signals using a Tomlinson-Harashima precoder and transmits the precoded signals over a channel to a receiver, which then processes the received signals to determine adaptive DFE coefficients without first applying a modulo decoder to the signals. The received signals are sampled and processed by an adaptive FFE. The equalized samples output by the FFE are then fed to a high-dynamic-range decision block, comprising an extended slicer and a DFE, which are capable of processing the full range of the samples without first limiting the samples to the modulo range of the precoder. As a result, the DFE is not exposed to the large, spurious errors that can be engendered by the modulo decoder, and propagation of these errors is prevented. The requisite modulo decoding is applied to the received samples either following the decision block or independently of the decision block, in a parallel decoding path.

Preferably, the decision block comprises an adaptive, feed-forward error predictor, in addition to the DFE. Most preferably, the decision block is configured as described in the above-mentioned U.S. patent application Ser. No. 09/472,109. After the FFE, DFE and error predictor have been suitably trained, an indication of the coefficients of the DFE and error predictor are conveyed to the transmitter for use in the precoder feedback loop, and the coefficients of the DFE and error predictor in the decision block are then zeroed. Preferably, the FFE coefficients are also adjusted at this point to account for the error predictor coefficients. Thereafter, the FFE, DFE and error predictor continue to adapt to changes in the channel characteristics, whereby new coefficients are determined. Periodically, the new coefficients are conveyed back to the transmitter for implementation in the precoder. Most preferably, a cost function is computed, which is related to the magnitude of the changes in the channel characteristics, and the coefficients are conveyed to the transmitter when the cost function exceeds a certain threshold.

There is therefore provided, in accordance with a preferred embodiment of the present invention, communications apparatus, including:

a transmitter, which includes:

a Tomlinson-Harashima precoder, which is coupled to receive and precode a sequence of input symbols, so as to generate a corresponding sequence of precoded symbols; and transmit circuitry, which is adapted to process the precoded symbols so as to generate a signal for transmission over a communication channel; and a receiver, which is coupled to receive the signal over the channel, and which includes:

a feed-forward equalizer (FFE), adapted to apply a feed-forward equalization function to the signal, so as to generate a sequence of equalized samples;

a decision block, which is coupled to receive the equalized samples from the FFE and to generate a sequence of decision output samples responsive thereto, the decision block including an adaptive filter, having coefficients determined adaptively responsive to a characteristic of the channel, an indication of which coefficients is conveyed by the receiver to the transmitter for implementation in the precoder; and a Tomlinson-Harashima decoder, which is coupled to receive a sequence of input samples including at least one of the sequence of decision output samples generated by the decision block and the sequence of equalized samples generated by the FFE, and to decode the input samples in order to reconstruct the sequence of input symbols.

Preferably, the equalized samples do not undergo Tomlinson-Harashima decoding before they are received by the decision block. Additionally or alternatively, the Tomlinson-Harashima precoder is adapted to precode the input symbols such that the precoded symbols are within a predetermined modulo range, and the decision block includes an extended slicer, which is adapted to generate the decision output samples over an extended range that is greater than the modulo range.

Preferably, the adaptive filter includes a decision feedback equalizer and/or an adaptive error predictor.

Further preferably, the Tomlinson-Harashima decoder is coupled to receive the sequence of equalized samples generated by the FFE, and the receiver further includes a decision device, which is coupled to receive the decoded input samples from the decoder and to generate the reconstructed input symbols.

Additionally or alternatively, the receiver is adapted to compute a cost function, indicative of a change in the coefficients of the adaptive filter, and to convey the indication of the coefficients to the transmitter when the cost function exceeds a predetermined threshold.

In a preferred embodiment, the Tomlinson-Harashima precoder includes a feedback loop filter having a filter response $DFET(z)$, and wherein the adaptive filter includes a decision feedback equalizer having an equalizer response $DFE(z)$ and an error predictor having an error prediction response $EP(z)$, and wherein after the indication of the coefficients is conveyed to the transmitter, an updated filter response $DFET'(z)$ is implemented in the feedback loop filter substantially as given by $DFET'(z)=[1+DFET(z)][1+DFE(z)\{1-EP(z)\}-EP(z)]-1$. Preferably, after the updated filter response is implemented in the feedback loop filter, the equalizer response $DFE(z)$ and the error prediction response $EP(z)$ are set to zero. Further preferably, the FFE has an adaptively-determined feed-forward response $FFE(z)$, and the error predictor includes a finite impulse response filter having a number of taps N, and when the indication of the coefficients is conveyed to the transmitter for implementation in the precoder, an updated feed-forward response $FFE'(z)$ is implemented in the FFE substantially as given by $FFE'(z)=FFE(z)(1-EP(z^N))$. Additionally or alternatively, the feedback loop filter includes a finite impulse response filter having a predetermined number of taps, and a time-domain representation of the updated filter response $DFET'(z)$ is adjusted so as to implement the updated filter response using the predetermined number of taps.

In another preferred embodiment, the Tomlinson-Harashima precoder includes a feedback loop filter having a filter response $DFET(z)$, and the adaptive filter includes a decision feedback equalizer having an equalizer response $DFE(z)$, and after the indication of the coefficients is conveyed to the transmitter, an updated filter response $DFET'(z)$ is implemented in the feedback loop filter substantially as given by $DFET'(z)=[1+DFET(z)][1+DFE(z)]-1$.

In yet another preferred embodiment, the Tomlinson-Harashima precoder includes a feedback loop filter having a filter response $DFET(z)$, and wherein the adaptive filter includes an error predictor having an error prediction response EP(z), and wherein after the indication of the coefficients is conveyed to the transmitter, an updated filter response DFET'(z) is implemented in the feedback loop filter substantially as given by DFET'(z)=[1+DFET(z)] [1−EP(z)]−1.

In a further preferred embodiment, the Tomlinson-Harashima precoder includes a feedback loop filter, and the indication of the coefficients conveyed by the receiver to the transmitter includes values of the coefficients, based upon which a filter response of the feedback loop filter is calculated and implemented at the transmitter. In an alternative embodiment, the filter response of the feedback loop filter is calculated at the receiver based on the coefficients, such that the indication of the coefficients conveyed by the receiver to the transmitter includes the calculated filter response.

There is also provided, in accordance with a preferred embodiment of the present invention, a receiver, for receiving a signal transmitted over a channel by a transmitter that includes a Tomlinson-Harashima precoder, the receiver including:

a feed-forward equalizer (FFE), adapted to apply a feed-forward equalization function to the signal, so as to generate a sequence of equalized samples;

a decision block, which is coupled to receive the equalized samples from the FFE and to generate a sequence of decision output samples responsive thereto, the decision block including an adaptive filter, having coefficients determined adaptively responsive to a characteristic of the channel; and a Tomlinson-Harashima decoder, which is coupled to receive and decode the decision output samples so as to reconstruct the sequence of input symbols.

There is additionally provided, in accordance with a preferred embodiment of the present invention, a receiver, for receiving a signal transmitted over a channel by a transmitter that includes a Tomlinson-Harashima precoder for precoding input symbols to be conveyed in the transmitted signal, the receiver including:

a feed-forward equalizer (FFE), adapted to apply a feed-forward equalization function to the signal, so as to generate a sequence of equalized samples;

a decision block, which is coupled to receive the equalized samples from the FFE and to generate a sequence of decision output samples responsive thereto, the decision block including an adaptive filter, having coefficients determined adaptively responsive to a characteristic of the channel, an indication of which coefficients is conveyed by the receiver to the transmitter for implementation in the precoder;

a Tomlinson-Harashima decoder, which is coupled to receive and decode the equalized samples from the FFE; and a decision device, which is coupled to receive and process the decoded samples from the decoder so as to reconstruct the input symbols.

There is further provided, in accordance with a preferred embodiment of the present invention, a method for conveying data over a communication channel, including:

precoding a sequence of input symbols at a transmitter using a Tomlinson-Harashima precoder having a predetermined modulo range;

transmitting the precoded symbols as a signal over the communication channel from the transmitter to a receiver;

receiving and processing the signal at the receiver to generate a sequence of received samples;

determining a sequence of decision output values of the received samples over a range of values greater than the modulo range of the precoder;

processing the decision output values using an adaptive filter so as to determine filter coefficient values responsive to a characteristic of the channel;

conveying an indication of the coefficient values to the transmitter for implementation in the precoder; and decoding a sequence of input samples using a Tomlinson-Harashima decoder at the receiver so as to reconstruct the sequence of input symbols, the sequence of input samples including at least one of the sequence of received samples and the sequence of decision output values.

There is moreover provided, in accordance with a preferred embodiment of the present invention, a method for conveying data over a communication channel, including:

precoding a sequence of input symbols at a transmitter using a Tomlinson-Harashima precoder and a feedback loop filter having a filter response DFET(z);

transmitting the precoded symbols as a signal over the communication channel from the transmitter to a receiver;

applying feed-forward equalization to the signal at the receiver, with an adaptive feed-forward equalization response FFE(z), to generate a sequence of equalized samples;

processing the equalized samples using an adaptive feedback filter so as to determine feedback filter coefficient values responsive to a characteristic of the channel;

conveying an indication of the feedback filter coefficient values to the transmitter for implementation in the feedback loop filter of the precoder;

updating the values of DFET(z) and FFE(z) responsive to the feedback filter coefficient values; and decoding the equalized samples using a Tomlinson-Harashima decoder at the receiver so as to reconstruct the sequence of input symbols.

Preferably, updating the values of DFET(z) and FFE(z) includes determining initial values of DFET(z) and FFE(z) during a start-up phase of the transmitter and the receiver, and altering the values at intervals thereafter during an operational phase of the transmitter and the receiver. Most preferably, altering the values includes computing a cost function, indicative of a change in the feedback filter coefficient values, and conveying the indication of the coefficients to the transmitter when the cost function exceeds a predetermined threshold.

The present invention will be more fully understood from the following detailed description of the preferred embodiments thereof, taken together with the drawings in which:

DETAILED DESCRIPTION OF PREFERRED EMBODIMENTS

Figure 1:
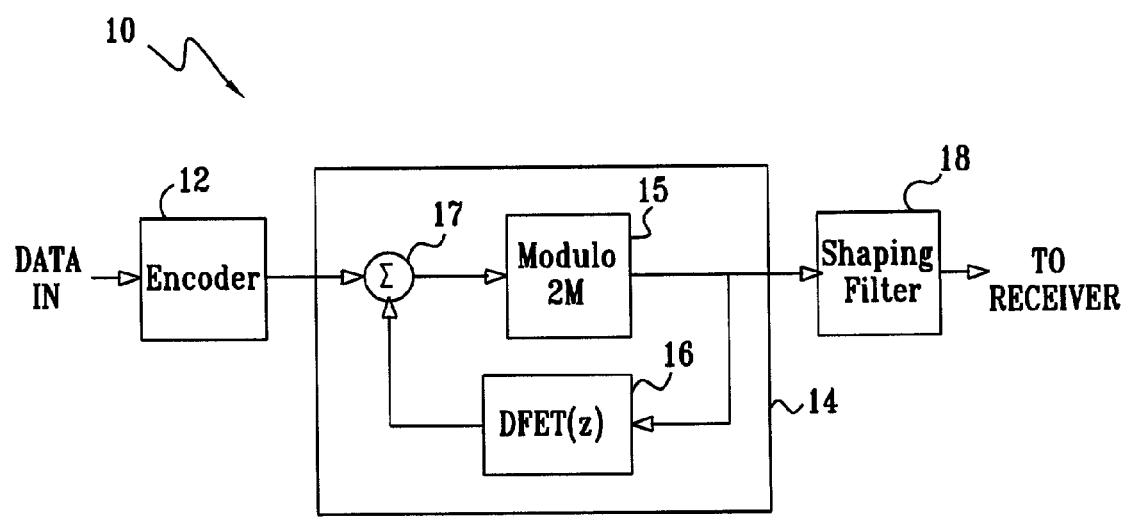
FIG. 1 is a block diagram that schematically illustrates a digital data transmitter with Tomlinson-Harashima precoding, in accordance with a preferred embodiment of the present invention.
Figure 3:
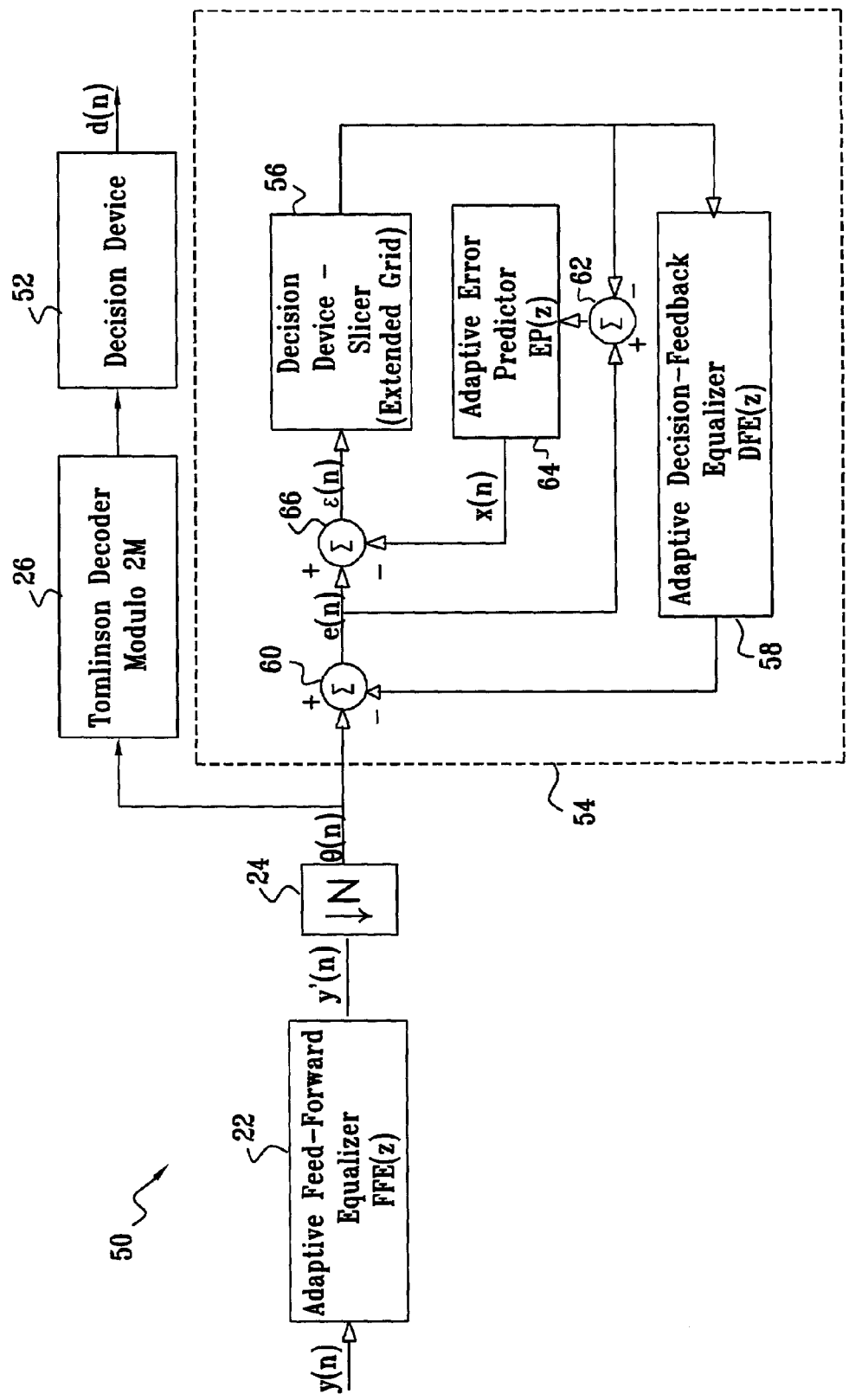
FIG. 3 is a block diagram that schematically illustrates a digital data receiver with adaptive equalization and error prediction, in accordance with a preferred embodiment of the present invention.

FIG. 1 is a block diagram that schematically illustrates a digital data transmitter 10 with Tomlinson-Harashima precoding, in accordance with a preferred embodiment of the present invention. A symbol encoder 12 receives an input data stream and generates a sequence of symbols for transmission over a channel to a receiver (preferably as shown in FIG. 3 or FIG. 5). The symbols are processed by a Tomlinson-Harashima precoder 14, comprising a modulo encoder 15 and a feedback loop filter 16. Encoder 15 performs the modulo function expressed by equation (1), above. Filter 16 applies a feedback function DFET(z) to the precoded symbols. DFET(z) is determined adaptively using novel methods described below with reference to FIGS. 3, 4 and 5. An adder 17 sums the output of filter 16 with the input symbols to encoder 15. The precoded symbols output by precoder 14 are prepared for transmission by transmit circuitry, which optionally includes a shaping filter 18, is known in the art. These symbols are then transmitted over the channel to the receiver.

Figure 2:
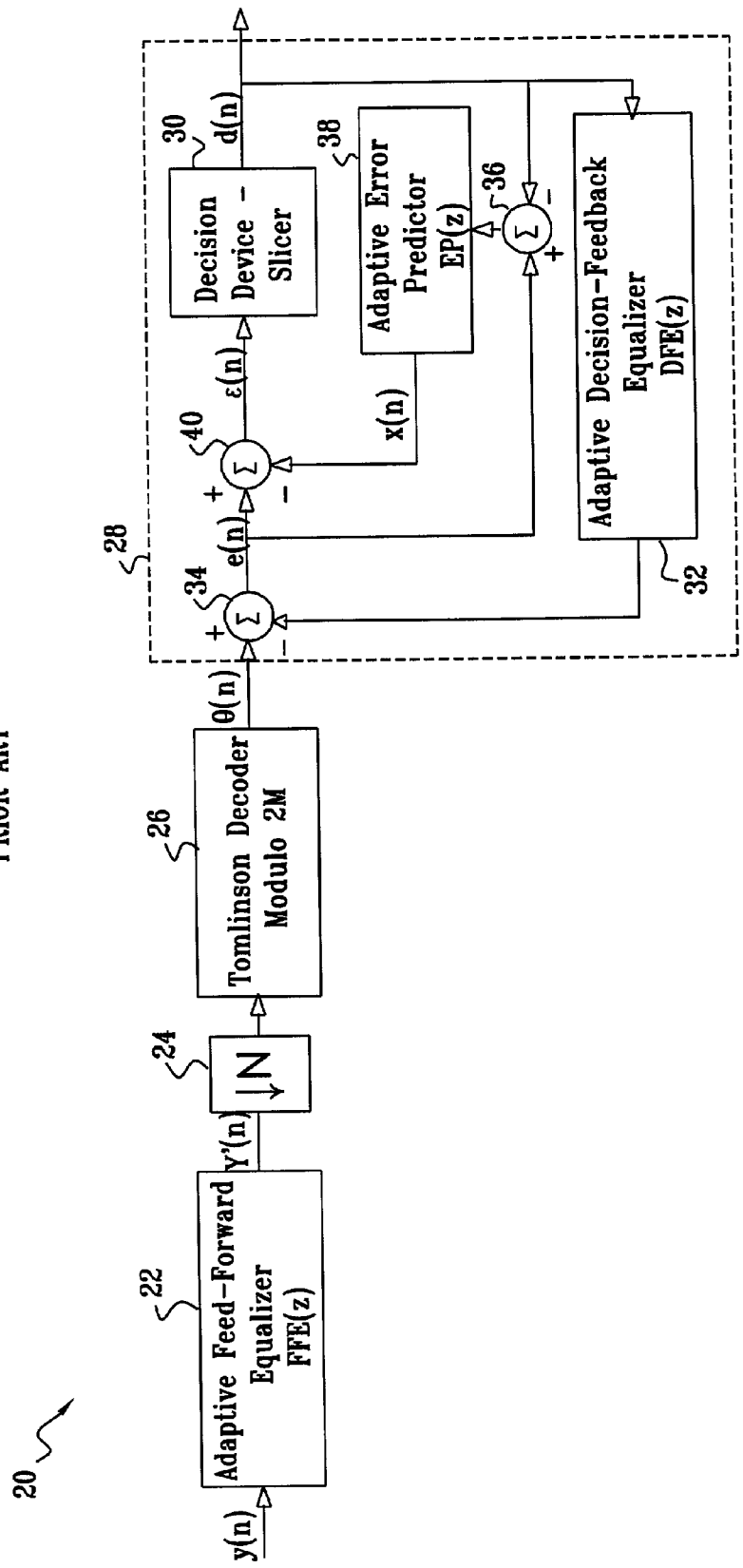
FIG. 2 is a block diagram that schematically illustrates a digital data receiver with adaptive equalization and error prediction, as is known in the art.

FIG. 2 is a block diagram that schematically illustrates a digital data receiver 20, as is known in the art. The receiver shown in this figure is substantively similar to those described in the above-mentioned U.S. Pat. Nos. 5,513,216 and 5,604,769. Signals received over the channel are digitized and sampled, giving a stream of samples y(n) that are input to an adaptive FFE 22. A decimator 24 typically downsamples the forward-equalized samples y'(n) to the symbol rate, and a modulo decoder 26 performs a modulo function to generate modified samples θ(n). Decoder 26 adds an integer multiple of 2M to each of the real and imaginary parts of each sample y'(n) so as to bring the corresponding parts of θ(n) into the range [−M,M), as expressed by equation (1). Since a different integer multiple may be applied to each sample y'(n) in order to bring it into the desired range, certain closely-spaced values of samples y'(n) will yield modified samples θ(n) that differ by as much as 2M.

The modified samples θ(n) are input to a decision block 28, which comprises a decision device 30, an adaptive DFE 32 and an adaptive error predictor 38. Decision device 30 typically comprises a simple slicer, with a limited range of −M to M. The decision output d(n) of the slicer is input to DFE 32, which generates an equalization output that is subtracted from the modified sample values θ(n) by an adder 34. DFE 32 typically comprises a multi-tap finite impulse response (FIR) filter, as is known in the art. To compensate for ISI in a typical communication channel, the FIR filter usually requires a substantial number of taps. The decision output d(n) is subtracted from the output of adder 34, e(n), by an adder 36 to provide an error input to a feed-forward error predictor 38. The error predictor, which also comprises a FIR filter, generates an adaptive error prediction output x(n), which is subtracted from e(n) by an adder 40 to provide a corrected input ε(n) to decision device 30.

As noted above, modulo decoder 26 intermittently introduces large, spurious fluctuations into the stream of samples θ(n), resulting in corresponding fluctuations in the decision output d(n) that is input to DFE 32. These spurious fluctuations are particularly likely to occur when the channel over which the signals are transmitted is noisy. As a result, large errors are introduced into the DFE and continue to propagate through decision block 28 for a long period after each occurrence. These errors can result in long sequences of symbols being discarded at the receiver as invalid and may necessitate retraining of the decision block.

FIG. 3 is a block diagram that schematically illustrates a digital data receiver 50, in accordance with a preferred embodiment of the present invention. This receiver is designed to work in conjunction with transmitter 10 (FIG. 1), while overcoming the problem of error propagation that occurs in prior art receivers, such as that shown in FIG. 2. In this embodiment, a decision block 54, which is used to determine adaptive DFE and error prediction coefficients, is separate from a parallel processing path that is used to determine the decision output d(n). This parallel path comprises only modulo decoder 26 and a decision device 52, without feedback from the DFE. Decision device 52 typically comprises a simple slicer, like decision device 30 (FIG. 2), or it may alternatively comprise a more complex decoder, such as a Viterbi decoder, as is known in the art.

As can be seen in FIG. 3, decision block 54 has no direct effect on the samples θ(n) that are input to decoder 26 and decision device 52. Rather, decision block 54 is used only for adaptively determining error prediction coefficients EP(z) and decision feedback equalization coefficients DFE(z), which are then implemented in feedback loop filter 16 of transmitter 10 (FIG. 1). For this purpose, the decision block receives forward-equalized samples θ(n) without prior modulo decoding. Therefore, decision block 54 must comprise an extended slicer 56, with a dynamic range sufficient to handle the entire constellation of possible values of the input samples to receiver 50, unlike decision device 52 which is limited to the range [−M,M). (The notation [−M,M) is conventionally known in the art to indicate that the lower bound −M is included in the range, while the upper bound M is not included.) The other elements of decision block 54, including an adaptive DFE 58, error predictor 64 and adders 60, 62 and 66, must similarly be configured with sufficient dynamic range and resolution to handle this constellation.

In other respects, however, the elements of decision block 54 are similar to their counterparts in decision block 28. Typically, DFE 58 and error predictor 64 comprise FIR filters. Details of the operation and construction of these elements, as well as alternative configurations that may be used in decision block 54, are described in the above-mentioned U.S. patent application Ser. No. 09/472,109. Alternatively, other filter designs and configurations may be used for DFE 58 and error predictor 64. For example, DFE 58 and feedback loop filter 16 may comprise infinite impulse response (IIR) filters, as described in U.S. patent application Ser. No. 09/637,797, or in PCT Patent Application No. PCT/IL00/00869. Both of these applications are assigned to the assignee of the present patent application and are incorporated herein by reference. Other suitable filter designs, as are known in the art, may also be used, such as those described in U.S. Pat. Nos. 5,513,216 and 5,604,769. Furthermore, although block 54 comprises both DFE 58 and error predictor 64, in other preferred embodiments of the present invention, not shown in the figures, the error predictor may be eliminated, or it may be included in the receive path but not participate in the precoding procedure described below.

Figure 4:
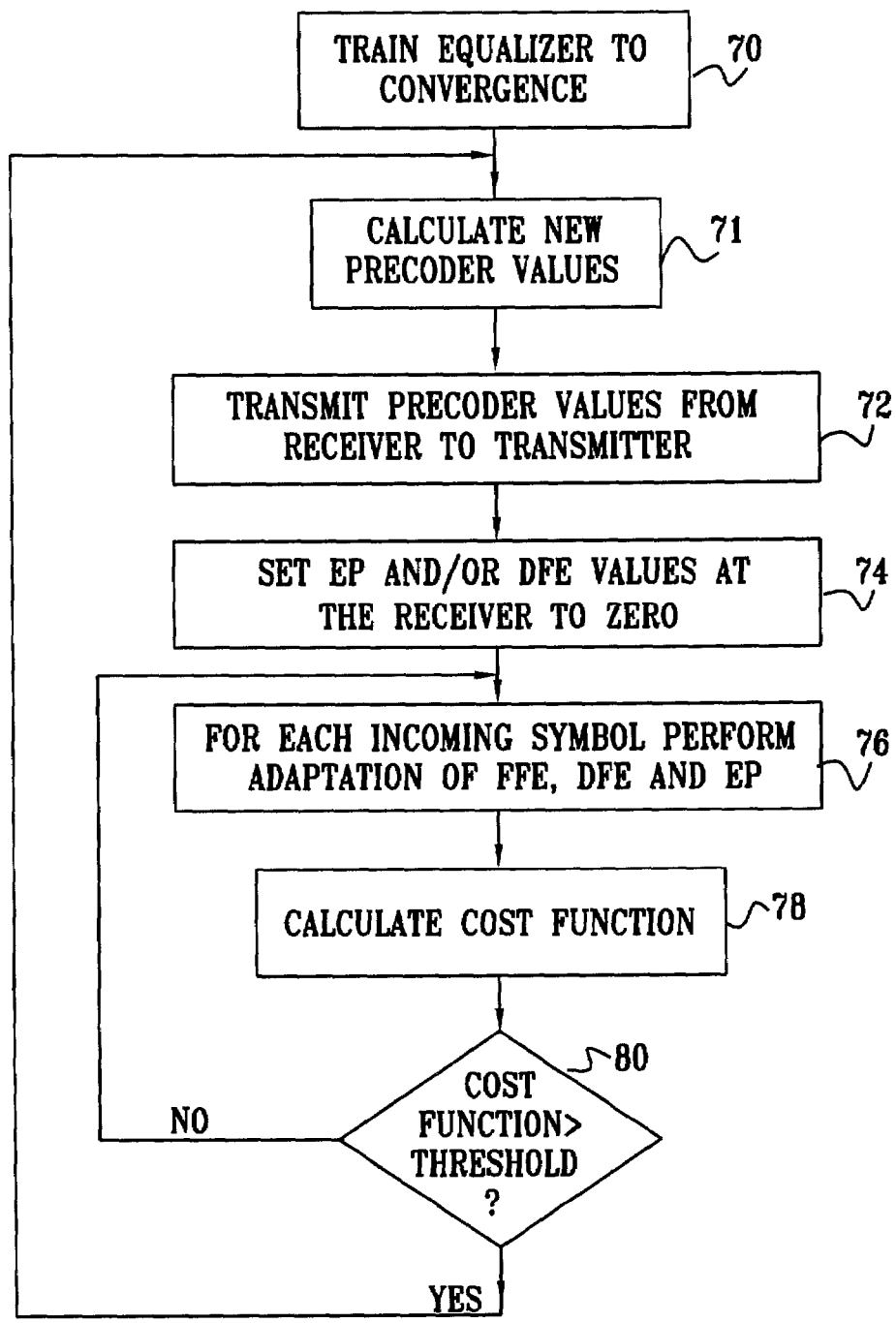
FIG. 4 is a flow chart that schematically illustrates a method for adaptive determination of filter coefficients used in a precoder feedback loop, in accordance with a preferred embodiment of the present invention.
Figure 5:
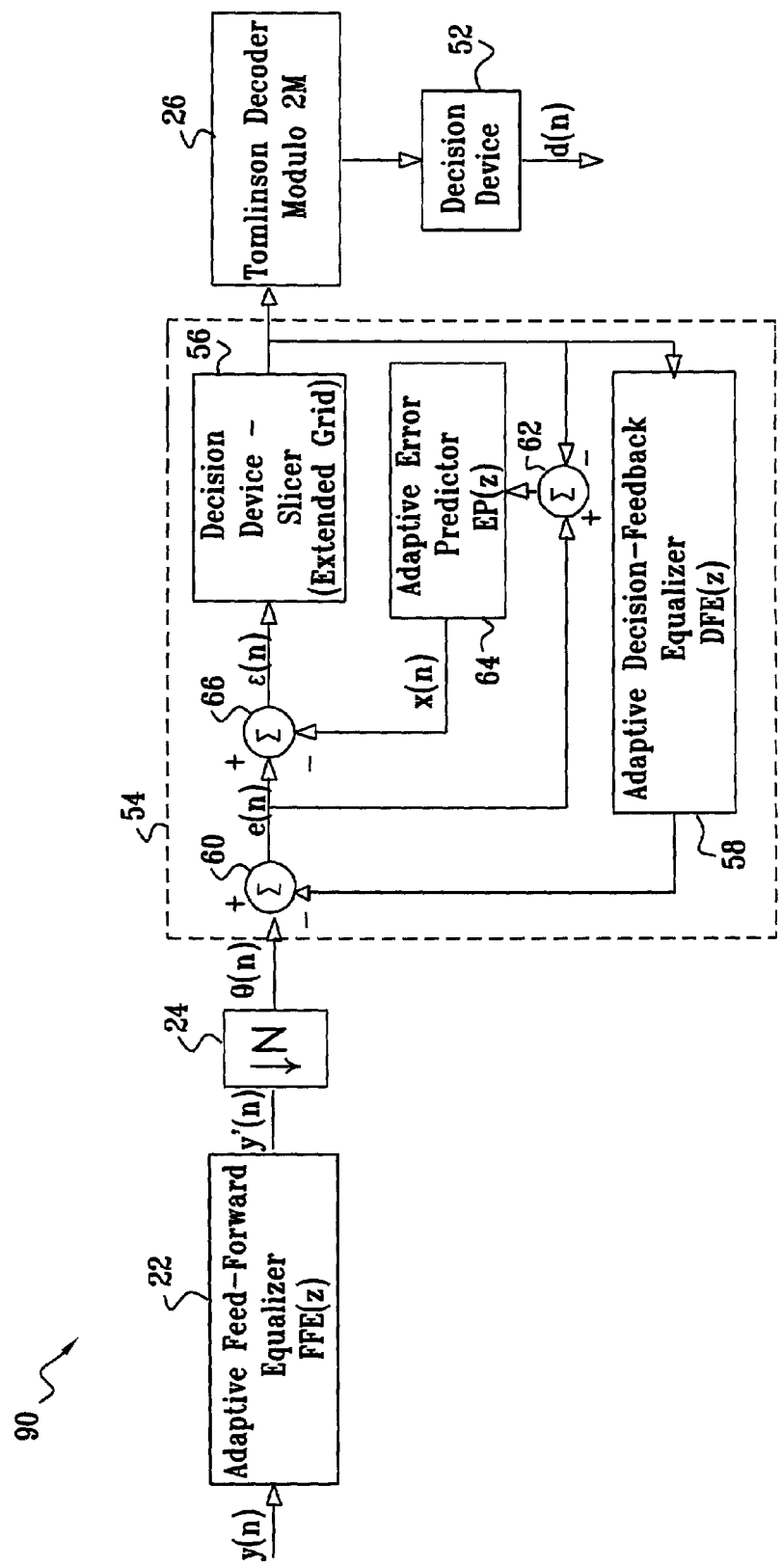
FIG. 5 is a block diagram that schematically illustrates a digital data receiver with adaptive equalization and error prediction, in accordance with another preferred embodiment of the present invention.

FIG. 4 is a flow chart that schematically illustrates a method for adaptively determining the coefficients of feedback loop filter 16 (FIG. 1), using decision block 54, in accordance with a preferred embodiment of the present invention. At an initial training step 70, transmitter 10 transmits a training sequence of symbols to receiver 50. At this stage, the coefficients of filter 16, representing DFET(z), are preferably set to zero. Alternatively, the feedback loop filter may be set to compensate for the response of fixed filter elements in the signal path, such as that of shaping filter 18, as described in the above-mentioned U.S. patent application Ser. No. 09/637,797, or PCT Patent Application No. PCT/IL00/00869, or in U.S. patent application Ser. No. 09/476,747, which is also assigned to the assignee of the present patent application and is incorporated herein by reference. This fixed filter compensation by the precoder is maintained subsequently, in conjunction with the adaptive response DFET(z). In any case, at step 70, the coefficients of FFE 22, DFE 58 and of adaptive error predictor 64 are adaptively adjusted, typically using a LMS procedure, until they have converged to their optimal values.

Upon completion of the training sequence, the coefficient values of DFE 58 (DFE(z)) and of predictor 64 (EP(z)) are used in calculating the coefficient values of FFE 22 (FFE(z)) and of feedback loop filter 16 (DFET(z)), at a coefficient calculation step 71. Preferably, the coefficients are determined according to the following equations:

$$FFE'(z)=FFE(z)(1-EP(z^N)) \quad (2)$$

$$DFET'(z)=[1+DFET(z)][1+DFE(z)\{1-EP(z)\}-EP(z)]-1 \quad (3)$$

Here FFE and DFET are the old coefficient values prior to step 71, and FFE' and DFET' are the new values found at this step. N represents the decimation factor of decimator 24. Note that initially DFET(z)=0, but in later iterations through step 71, as described below, this is not the case.

The new value of DFET'(z) is conveyed to transmitter 10 at a coefficient transmission step 72. Alternatively, the coefficients of DFE(z) and EP(z) may be conveyed to the transmitter, for calculation of DFET'(z) there.) After setting the new FFE and DFET values, the coefficients of DFE 58 and error predictor 64 are set to zero, at a decision block reset step 74. Alternatively, filter 16 may be adjusted to compensate only for ISI, in which case only DFE(z) is zeroed, or only for noise, in which case only EP(z) is zeroed at this step.

Transmitter 10 now begins transmitting actual data signals to receiver 50, with precoding by precoder 14 based on the feedback loop filter response determined at step 71. Receiver 50 continues to adjust the coefficients of FFE(z), DFE(z) and EP(z) adaptively during transmission, at an adaptation step 76. Although the values of the DFE and EP coefficients have been zeroed, changes in the channel and/or noise characteristics will typically cause the magnitudes of the coefficients to grow over time. Periodically, the new coefficients must be conveyed to precoder 14, in order to compensate for the channel and noise changes and prevent errors by decision device 52. Preferably, the receiver decides to pass the new coefficients back to the transmitter when a sufficient change has accumulated in the coefficients. Most preferably, receiver 50 decides when to pass the new coefficients back to transmitter 10 based on a cost function C(n), which is computed at a cost calculation step 78. A preferred cost function is expressed as follows:

$$C(n)\alpha C(n-1)+(\theta(n)-\epsilon(n))^2 \quad (4)$$

Here $\theta(n)$ is the input to block 54, $\epsilon(n)$ is the input to decision device 56, and $\alpha$ is an adjustable parameter, $0\leq\alpha<1$. Other suitable cost functions will be apparent to those skilled in the art.

Receiver 50 compares the cost function to a predetermined threshold, at a cost comparison step 80. When the accumulated cost surpasses the threshold, the new values of DFE(z) and EP(z) are used to calculate a new value of DFET(z), based on equation (3), and a new value of FFE (z), based on equation (2), at step 71. These values are passed to the transmitter at step 72, and the cycle continues. Alternatively or additionally, the new values of DFET (z) and FFE (z) may be calculated and passed to the transmitter periodically, after a specified time period has elapsed, for example.

The convolution operations involved in implementing the results of equations (2) and (3) in the time domain would inherently be expected to result in FIR filters of increasing length at each iteration through the process of FIG. 4. The filter coefficients are preferably adjusted in each iteration, however, so that the FIR filters do not exceed desired number of taps. The simplest way (but not the only way) of making such an adjustment is truncating the coefficients. The new value of DFET(z) is returned to transmitter 10, at step 72, and the process continues as described above.

Although the procedure described above and the formula of equation (3) relate to a general case in which coefficient values of both DFE 58 (DFE(z)) and predictor 64 (EP(z)) are used in calculating the coefficient values of feedback loop filter 16 (DFET(z)), in alternative embodiments of the preferred embodiment, only DFE(z) or only EP(z) may be used. In the former case, when error prediction is not used in determining the feedback filter coefficients, the new coefficients are given by setting EP(z)=0 in equation (3), yielding:

$$DFET'(z)=[1+DFET(z)][1+DFE(z)]-1 \quad (5)$$

In the latter case, when the DFE is not used in determining the feedback filter coefficients, the new coefficients are given by setting DFE(z)=0 in equation (3):

$$DFET'(z)=[1+DFET(z)][1-EP(z)]-1 \quad (6)$$

FIG. 5 is a block diagram that schematically illustrates a receiver 90, in accordance with another preferred embodiment of the present invention. This receiver is similar to receiver 50 shown in FIG. 3, except that decision block 54 is used both to generate the adaptive DFE and error prediction coefficients and to process the samples $\theta(n)$ before they are input to decoder 26. Receiver 90 can be used to receive signals from transmitter 10 and to convey adaptive filter coefficients to the transmitter in substantially the same manner as receiver 50. Receiver 90 has the advantage over receiver 50 of being less sensitive to short-term variations in the channel characteristics, particularly noise, since DFE 58 and error predictor 64 adapt to correct for these variations even when feedback loop filter 16 has not yet been adjusted to compensate for them. On the other hand, because DFE 58 is a part of the decoding path of the output symbols d(n) in receiver 90, there is still some likelihood that the output symbols will be corrupted by error propagation.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Communications apparatus, comprising:
a transmitter, which comprises:
a Tomlinson-Harashima precoder, which is coupled to receive and precode a sequence of input symbols, so as to generate a corresponding sequence of precoded symbols; and
transmit circuitry, which is adapted to process the precoded symbols so as to generate a signal for transmission over a communication channel; and
a receiver, which is coupled to receive the signal over the channel, and which comprises:
a feed-forward equalizer (FFE), adapted to apply a feed-forward equalization function to the signal, so as to generate a sequence of equalized samples;
a decision block, which is coupled to receive the equalized samples from the FFE and to generate a sequence of decision output samples responsive thereto,
the decision block comprising an adaptive filter, having coefficients determined adaptively responsive to a characteristic of the channel, an indication of which coefficients is conveyed by the receiver to the transmitter for implementation in the precoder; and
a Tomlinson-Harashima decoder, which is coupled to receive a sequence of input samples comprising at least one of the sequence of decision output samples generated by the decision block and the sequence of equalized samples generated by the FFE, and to decode the input samples in order to reconstruct the sequence of input symbols;
wherein the equalized samples do not undergo Tomlinson-Harashima decoding before they are received by the decision block.

2. Apparatus according to claim 1, wherein the Tomlinson-Harashima precoder is adapted to precode the input symbols such that the precoded symbols are within a predetermined modulo range, and wherein the decision block comprises an extended slicer, which is adapted to generate the decision output samples over an extended range that is greater than the modulo range.

3. Apparatus according to claim 1, wherein the adaptive filter comprises a decision feedback equalizer.

4. Apparatus according to claim 1, wherein the adaptive filter comprises an adaptive error predictor.

5. Apparatus according to claim 1, wherein the Tomlinson-Harashima decoder is coupled to receive the sequence of equalized samples generated by the FFE, and wherein the receiver further comprises a decision device, which is coupled to receive the decoded input samples from the decoder and to generate the reconstructed input symbols.

6. Apparatus according to claim 1, wherein the receiver is adapted to compute a cost function, indicative of a change in the coefficients of the adaptive filter, and to convey the indication of the coefficients to the transmitter when the cost function exceeds a predetermined threshold.

7. Apparatus according to claim 1, wherein the Tomlinson-Harashima precoder comprises a feedback loop filter having a filter response $DFET(z)$, and wherein the adaptive filter comprises a decision feedback equalizer having an equalizer response $DFE(z)$ and an error predictor having an error prediction response $EP(z)$, and wherein after the indication of the coefficients is conveyed to the transmitter, an updated filter response $DFET'(z)$ is implemented in the feedback loop filter substantially as given by $DFET'(z)=[1+DFET(z)][1+DFE(z)\{1-EP(z)\}-EP(z)]-1$.

8. Apparatus according to claim 7, wherein after the updated filter response is implemented in the feedback loop filter, the equalizer response $DFE(z)$ and the error prediction response $EP(z)$ are set to zero.

9. Apparatus according to claim 8, wherein the FFE has an adaptively-determined feed-forward response $FFE(z)$, and wherein the error predictor comprises a finite impulse response filter have a number of taps N, and wherein when the indication of the coefficients is conveyed to the transmitter for implementation in the precoder, an updated feed-forward response $FFE'(z)$ is implemented in the FFE substantially as given by $FFE'(z)=FFE(z)(1-EP(zN))$.

10. Apparatus according to claim 7, wherein the feedback loop filter comprises a finite impulse response filter having a predetermined number of taps, and wherein a time-domain representation of the updated filter response $DFET'(z)$ is adjusted so as to implement the updated filter response using the predetermined number of taps.

11. Apparatus according to claim 1, wherein the Tomlinson-Harashima precoder comprises a feedback loop filter having a filter response $DFET(z)$, and wherein the adaptive filter comprises a decision feedback equalizer having an equalizer response $DFE(z)$, and wherein after the indication of the coefficients is conveyed to the transmitter, an updated filter response $DFET'(z)$ is implemented in the feedback loop filter substantially as given by $DFET'(z)=[1+DFET(z)][1+DFE(z)]-1$.

12. Apparatus according to claim 1, wherein the Tomlinson-Harashima precoder comprises a feedback loop filter having a filter response $DFET(z)$, and wherein the adaptive filter comprises an error predictor having an error prediction response $EP(z)$, and wherein after the indication of the coefficients is conveyed to the transmitter, an updated filter response $DFET'(z)$ is implemented in the feedback loop filter substantially as given by $DFET'(z)=[1+DFET(z)][1-EP(z)]-1$.

13. Apparatus according to claim 1, wherein the Tomlinson-Harashima precoder comprises a feedback loop filter, and wherein the indication of the coefficients conveyed by the receiver to the transmitter comprises values of the coefficients, based upon which a filter response of the feedback loop filter is calculated and implemented at the transmitter.

14. Apparatus according to claim 1, wherein the Tomlinson-Harashima precoder comprises a feedback loop filter, and wherein a filter response of the feedback loop filter is calculated at the receiver based on the coefficients, such that the indication of the coefficients conveyed by the receiver to the transmitter comprises the calculated filter response.

15. A receiver, for receiving a signal transmitted over a channel by a transmitter that includes a Tomlinson-Harashima precoder, the receiver comprising:
a feed-forward equalizer (FFE), adapted to apply a feed-forward equalization function to the signal, so as to generate a sequence of equalized samples;
a decision block, which is coupled to receive the equalized samples from the FFE and to generate a sequence of decision output samples responsive thereto, the decision block comprising an adaptive filter, having coefficients determined adaptively responsive to a characteristic of the channel; and
a Tomlinson-Harashima decoder, which is coupled to receive and decode the decision output samples so as to reconstruct the sequence of input symbols;
Wherein the equalized samples do not undergo Tomlinson-Harashima decoding before they are received by the decision block.

16. A receiver according to claim 15, wherein the Tomlinson-Harashima decoder has a predetermined modulo range, and wherein the decision block comprises an extended slicer, which is adapted to generate the decision output samples over an extended range that is greater than the modulo range.

17. A receiver according to claim 15, wherein the adaptive filter comprises a decision feedback equalizer.

18. A receiver according to claim 15, wherein the adaptive filter comprises an adaptive error predictor.

19. A receiver, for receiving a signal transmitted over a channel by a transmitter that includes a Tomlinson-Harashima precoder for precoding input symbols to be conveyed in the transmitted signal, the receiver comprising:
   a feed-forward equalizer (FFE), adapted to apply a feed-forward equalization function to the signal, so as to generate a sequence of equalized samples;
   a decision block, which is coupled to receive the equalized samples from the FFE and to generate a sequence of decision output samples responsive thereto, the decision block comprising an adaptive filter, having coefficients determined adaptively responsive to a characteristic of the channel, an indication of which coefficients is conveyed by the receiver to the transmitter for implementation in the precoder;
   a Tomlinson-Harashima decoder, which is coupled to receive and decode the equalized samples from the FFE; and
   a decision device, which is coupled to receive and process the decoded samples from the decoder so as to reconstruct the input symbols;
   wherein the equalized samples do not undergo Tomlinson-Harashima decoding before they are received by the decision block.

20. A receiver according to claim 19, wherein the Tomlinson-Harashima decoder has a predetermined modulo range, and wherein the decision block comprises an extended slicer, which is adapted to generate the decision output samples over an extended range that is greater than the modulo range.

21. A receiver according to claim 19, wherein the adaptive filter comprises a decision feedback equalizer.

22. A receiver according to claim 19, wherein the adaptive filter comprises an adaptive error predictor.

23. A receiver according to claim 19, wherein the indication of the coefficients conveyed by the receiver to the transmitter comprises values of the coefficients, for calculation of a filter response of a feedback loop filter in the Tomlinson-Harashima precoder based on the values.

24. A receiver according to claim 19, wherein a filter response of a feedback loop filter in the Tomlinson-Harashima precoder is calculated at the receiver based on the coefficients, such that the indication of the coefficients conveyed by the receiver to the transmitter comprises the calculated filter response.

25. A method for conveying data over a communication channel, comprising:
   precoding a sequence of input symbols at a transmitter using a Tomlinson-Harashima precoder having a predetermined modulo range;
   transmitting the precoded symbols as a signal over the communication channel from the transmitter to a receiver;
   receiving and processing the signal at the receiver to generate a sequence of received samples;
   determining a sequence of decision output values of the received samples over a range of values greater than the modulo range of the precoder;
   processing the decision output values using an adaptive filter so as to determine filter coefficient values responsive to a characteristic of the channel;
   conveying an indication of the coefficient values to the transmitter for implementation in the precoder; and
   decoding a sequence of input samples using a Tomlinson-Harashima decoder at the receiver so as to reconstruct the sequence of input symbols, the sequence of input samples comprising at least one of the sequence of received samples and the sequence of decision output values;
   wherein determining the sequence of decision output values comprises processing the received samples without prior Tomlinson-Harashima decoding of the received samples.

26. A method according to claim 25, wherein conveying the indication comprises conveying the values of the coefficients, for calculation of a filter response of a feedback loop filter in the Tomlinson-Harashima precoder based on the values.

27. A method according to claim 25, wherein conveying the indication comprises calculating a filter response of a feedback loop filter in the Tomlinson-Harashima precoder at the receiver based on the coefficient values, and conveying the calculated filter response to the transmitter.

28. A method according to claim 25, wherein processing the decision output values comprises applying decision feedback equalization to the received samples using the values, so that the filter coefficients comprise adaptive decision feedback equalization coefficients.

29. A method according to claim 25, wherein processing the decision output values comprises applying error prediction to the received samples using the values, so that the filter coefficients comprise adaptive error prediction coefficients.

30. A method according to claim 25, wherein decoding the sequence of input samples comprises applying a module operation to the sequence of received samples so as to generate decoded samples within the predetermined modulo range, and applying a decision device to the decoded samples so as to reconstruct the input symbols.

31. A method according to claim 25, wherein conveying the indication of the coefficient values to the transmitter comprises computing a cost function, indicative of a change in the coefficient values, and conveying the indication of the coefficients to the transmitter when the cost function exceeds a predetermined threshold.

32. A method according to claim 25, wherein determining the filter coefficient values comprises determining a decision feedback equalization response $DFE(z)$ and an error prediction response $EP(z)$, and wherein precoding the sequence of input symbols comprises precoding the symbols using a feedback loop filter having a filter response $DFET(z)$, and recalculating $DFET(z)$ after the indication of the coefficients is conveyed to the transmitter to generate an updated filter response $DFET'(z)$ substantially as given by $DFET'(z) = [1+DFET(z)][1+DFE(z)\{1-EP(z)\}-EP(z)]-1$.

33. A method according to claim 32, wherein processing the decision output values comprises, after the updated filter response is implemented in the feedback loop filter, setting the equalization response $DFE(z)$ and the error prediction response $EP(z)$ to zero.

34. A method according to claim 33, wherein processing the decision output values comprises applying the error prediction response $EP(z)$ using a finite impulse response filter having a number of taps N, and wherein receiving and processing the signal at the receiver comprises applying feed-forward equalization to the signal with an adaptively-determined feed-forward response FFE(z), and when the error prediction response is set to zero, adjusting the feed-forward response to an updated response FFE'(z) substantially as given by FFE'(z)=FFE(z)(1−EP(zN)).

35. A method according to claim 32, wherein using the feedback loop filter comprises applying a finite impulse response filter having a predetermined number of taps, and wherein recalculating DFET(z) comprises adjusting a time-domain representation of the updated filter response DFET'(z) so as to implement the updated filter response using the predetermined number of taps.

36. A method according to claim 35, wherein adjusting the time-domain representation comprises truncating the representation.

37. A method according to claim 25, wherein determining the filter coefficient values comprises determining a decision feedback equalization response DFE(z), and wherein precoding the sequence of input symbols comprises precoding the symbols using a feedback loop filter having a filter response DFET(z), and recalculating DFET(z) after the indication of the coefficients is conveyed to the transmitter to generate an updated filter response DFET'(z) substantially as given by DFET'(z)=[1+DFET(z)][1+DFE(z)]−1.

38. A method according to claim 25, wherein determining the filter coefficient values comprises determining an error prediction response EP(z), and wherein precoding the sequence of input symbols comprises precoding the symbols using a feedback loop filter having a filter response DFET(z), and recalculating DFET(z) after the indication of the coefficients is conveyed to the transmitter to generate an updated filter response DFET'(z) substantially as given by DFET'(z)=[1+DFET(z)][1−EP(z)]−1.

39. A method for conveying data over a communication channel, comprising:
 precoding a sequence of input symbols at a transmitter using a Tomlinson-Harashima precoder and a feedback loop filter having a filter response DFET(z);
 transmitting the precoded symbols as a signal over the communication channel from the transmitter to a receiver;
 applying feed-forward equalization to the signal at the receiver, with an adaptive feed-forward equalization response FFE(z), to generate a sequence of equalized samples;
 processing the equalized samples using an adaptive feedback filter so as to determine feedback filter coefficient values responsive to a characteristic of the channel;
 conveying an indication of the feedback filter coefficient values to the transmitter for implementation in the feedback loop filter of the precoder;
 updating the values of DFET(z) and FFE(z) responsive to the feedback filter coefficient values; and
 decoding the equalized samples using a Tomlinson-Harashima decoder at the receiver so as to reconstruct the sequence of input symbols;
 wherein processing the equalized samples comprises processing the equalized samples without prior Tomlinson-Harashima decoding of the equalized samples.

40. A method according to claim 39, wherein conveying the indication comprises conveying the values of the coefficients, and wherein updating the value of DFET(z) comprises calculating an updated value of DFET(z) at the transmitter based on the values of the coefficients.

41. A method according to claim 39, wherein conveying the indication comprises calculating an updated value of DFET(z) at the receiver based on the coefficient values, and conveying the calculated value to the transmitter.

42. A method according to claim 39, wherein precoding the sequence of input symbols comprises applying a modulo operation to the input symbols with a predetermined modulo range, and wherein processing the equalized samples comprises determining a sequence of decision output values of the received samples over a range of values greater than the modulo range of the precoder, and determining the feedback filter coefficient values based on the decision output values.

43. A method according to claim 42, wherein decoding the equalized samples comprises applying the Tomlinson-Harashima decoder to the decision output values.

44. A method according to claim 43, wherein decoding the equalized samples comprises applying the Tomlinson-Harashima decoder to the equalized samples without first having processed the equalized samples using the adaptive feedback filter.

45. A method according to claim 39, wherein processing the equalized samples comprises applying error prediction to the samples, so that the filter coefficient values comprise values corresponding to an error prediction response EP(z).

46. A method according to claim 45, wherein processing the equalized samples further comprises applying decision feedback equalization to the samples, so that the filter coefficient values comprise further values corresponding to a decision feedback equalization response DFE(z).

47. A method according to claim 46, wherein updating the value of DFET(z) comprises recalculating DFET(z) to generate an updated filter response DFET'(z) substantially as given by DFET'(z)=[1+DFET(z)][1+DFE(z){1−EP(z)}−EP(z)]−1.

48. A method according to claim 45, wherein updating the value of DFET(z) comprises recalculating DFET(z) to generate an updated filter response DFET'(z) substantially as given by DFET'(z)=[1+DFET(z)][1−EP(z)]−1.

49. A method according to claim 45, wherein processing the equalized samples comprises applying the error prediction response EP(z) using a finite impulse response filter have a number of taps N, and wherein updating the value of FFE(z) comprises recalculating FFE(z) to generate an updated response FFE'(z) substantially as given by FFE'(z)=FFE(z)(1−EP(zN)).

50. A method according to claim 39, wherein processing the equalized samples comprises applying decision feedback equalization to the samples, so that the filter coefficient values comprise values corresponding to a decision feedback equalization response DFE(z), and wherein updating the value of DFET(z) comprises recalculating DFET(z) to generate an updated filter response DFET'(z) substantially as given by DFET'(z)=[1+DFET(z)][1+DFE(z)]−1.

51. A method according to claim 39, wherein processing the equalized samples comprises, after updating the value of DFET(z) and FFE(z), setting at least some of the feedback filter coefficient values to zero.

52. A method according to claim 39, wherein using the feedback loop filter comprises applying a finite impulse response filter having a predetermined number of taps, and wherein updating the value of DFET(z) comprises adjusting a time-domain representation of the updated value so as to implement the updated filter response using the predetermined number of taps.

53. A method according to claim 52, wherein adjusting the time-domain representation comprises truncating the representation.

54. A method according to claim 39, wherein updating the values of DFET(z) and FFE(z) comprises determining initial values of DFET(z) and FFE(z) during a start-up phase of the transmitter and the receiver, and altering the values at intervals thereafter during an operational phase of the transmitter and the receiver.

55. A method according to claim 54, wherein altering the values comprises computing a cost function, indicative of a change in the feedback filter coefficient values, and conveying the indication of the coefficients to the transmitter when the cost function exceeds a predetermined threshold.

* * * * *